US010779282B1

(12) United States Patent
Sung et al.

(10) Patent No.: US 10,779,282 B1
(45) Date of Patent: Sep. 15, 2020

(54) MULTIPLE USER MULTIPLE INPUT MULTIPLE OUTPUT (MU-MIMO) OPTIMIZATION USING USER EQUIPMENT (UE) POWER ALLOCATION

(71) Applicant: Sprint Communications Company L.P., Overland Park, KS (US)

(72) Inventors: Sanghoon Sung, Ashburn, VA (US); Yun Sung Kim, Ashburn, VA (US); Min Ho Song, Ashburn, VA (US); Tri Q. Duong, Annandale, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 16/265,645

(22) Filed: Feb. 1, 2019

(51) Int. Cl.
| | | |
|---|---|---|
| *H04L 12/26* | (2006.01) | |
| *H04W 72/04* | (2009.01) | |
| *H04B 7/0452* | (2017.01) | |
| *H04W 52/24* | (2009.01) | |
| *H04W 88/08* | (2009.01) | |
| *H04W 88/02* | (2009.01) | |

(52) U.S. Cl.
CPC ...... *H04W 72/0473* (2013.01); *H04B 7/0452* (2013.01); *H04W 52/241* (2013.01); *H04W 52/245* (2013.01); *H04W 88/02* (2013.01); *H04W 88/08* (2013.01)

(58) Field of Classification Search
CPC ... H04L 5/0044; H04L 5/0048; H04L 5/0023; H04B 7/0452; H04B 7/0617
See application file for complete search history.

(56) References Cited

U.S. PATENT DOCUMENTS

| | | | |
|---|---|---|---|
| 8,326,341 B2 | 12/2012 | Hugi et al. | |
| 8,553,795 B2 | 10/2013 | Xu et al. | |
| 8,554,261 B2 | 10/2013 | Niu et al. | |
| 9,225,396 B2 | 12/2015 | Maltsev et al. | |
| 2011/0077044 A1 | 3/2011 | Sampath et al. | |
| 2013/0058293 A1 | 3/2013 | Nishikawa et al. | |
| 2013/0308717 A1 | 11/2013 | Maltsev et al. | |
| 2015/0003261 A1* | 1/2015 | Silverman | H04B 7/0452 370/252 |
| 2018/0234141 A1* | 8/2018 | Silverman | H04B 7/0452 |

\* cited by examiner

*Primary Examiner* — Jamal Javaid

(57) ABSTRACT

A wireless access point serve wireless User Equipment (UEs) using Multiple User Multiple Input Multiple Output (MU-MIMO). In the wireless access point, radio circuitry wirelessly receives network signaling from the UEs. Control circuitry processes the network signaling and determines initial power allocations to the UEs and initial MU-MIMO groups of the UEs. The control circuitry processes the initial power allocations and the initial MU-MIMO groups and determines new power allocations and new MU-MIMO groups. The radio circuitry wirelessly transmits MU-MIMO signals to the UEs in the new MU-MIMO groups using the new power allocations.

18 Claims, 6 Drawing Sheets

MULTIPLE USER MULTIPLE INPUT MULTIPLE OUTPUT (MU-MIMO) OPTIMIZATION USING USER EQUIPMENT (UE) POWER ALLOCATION

TECHNICAL BACKGROUND

Wireless communication networks serve wireless User Equipment (UE) with mobile data services like voice calling and internet access. The wireless data networks have wireless access points that exchange data signals over the air with the wireless UEs. The wireless access points exchange this data with network elements. The network elements exchange the data with various systems like the internet and media servers. Popular forms of wireless networking are Fifth Generation New Radio (5GNR) and Long Term Evolution (LTE).

The wireless communication networks use radios to transfer and receive wireless data signals. The radios each have multiple antennas that form an antenna array. The radios use Multiple Input Multiple Output (MIMO) to control which antennas that a given data signal traverses through their antenna array. The radios also use beamforming to focus data signal energy on targeted UEs. Beamforming controls the power and phase of each data signal at each transmitting antenna in the array.

In the wireless communication networks, the radios use Multiple User MIMO (MU-MIMO) to transfer wireless signals to multiple UEs using the same shared time and frequency. By using MU-MIMO with beamforming, each of the different data signals has a different combination of transmit powers and phases across the antennas in the array. To enhance beamforming, the UEs in a given MU-MIMO group are selected to have geographically diverse angles or azimuths from one another from the perspective of the wireless access point.

The lower number of antennas among the MU-MIMO transmitter and the MU-MIMO receiver designates the MU-MIMO layer. Thus, a wireless access point with 64 antennas and a UE with four antennas has a MU-MIMO layer of four. The number of antennas in the UE typically sets the MU-MIMO layer. MU-MIMO UEs are grouped by their MU-MIMO layer and their geographic diversity. For example, UEs at MU-MIMO layer four that have geographically diverse locations would be grouped together to share time and frequency.

The UEs in the same MU-MIMO layer are allocated the same amount of transmit power from the wireless access point to the UE. For example, a wireless access point transmits data signals to all UEs at MU-MIMO layer four at the same transmit power. Unfortunately, the wireless access point does not effectively and efficiently control these transmit power allocations to optimize MU-MIMO.

TECHNICAL OVERVIEW

A wireless access point serve wireless User Equipment (UEs) using Multiple User Multiple Input Multiple Output (MU-MIMO). In the wireless access point, radio circuitry wirelessly receives network signaling from the UEs. Control circuitry processes the network signaling to determine initial power allocations to the UEs and initial MU-MIMO groups of the UEs. The control circuitry processes the initial power allocations and the initial MU-MIMO groups to determine new power allocations and new MU-MIMO groups. The radio circuitry wirelessly transmits MU-MIMO signals using the new power allocations to the UEs in the new MU-MIMO groups.

DETAILED DESCRIPTION

Figure 1:
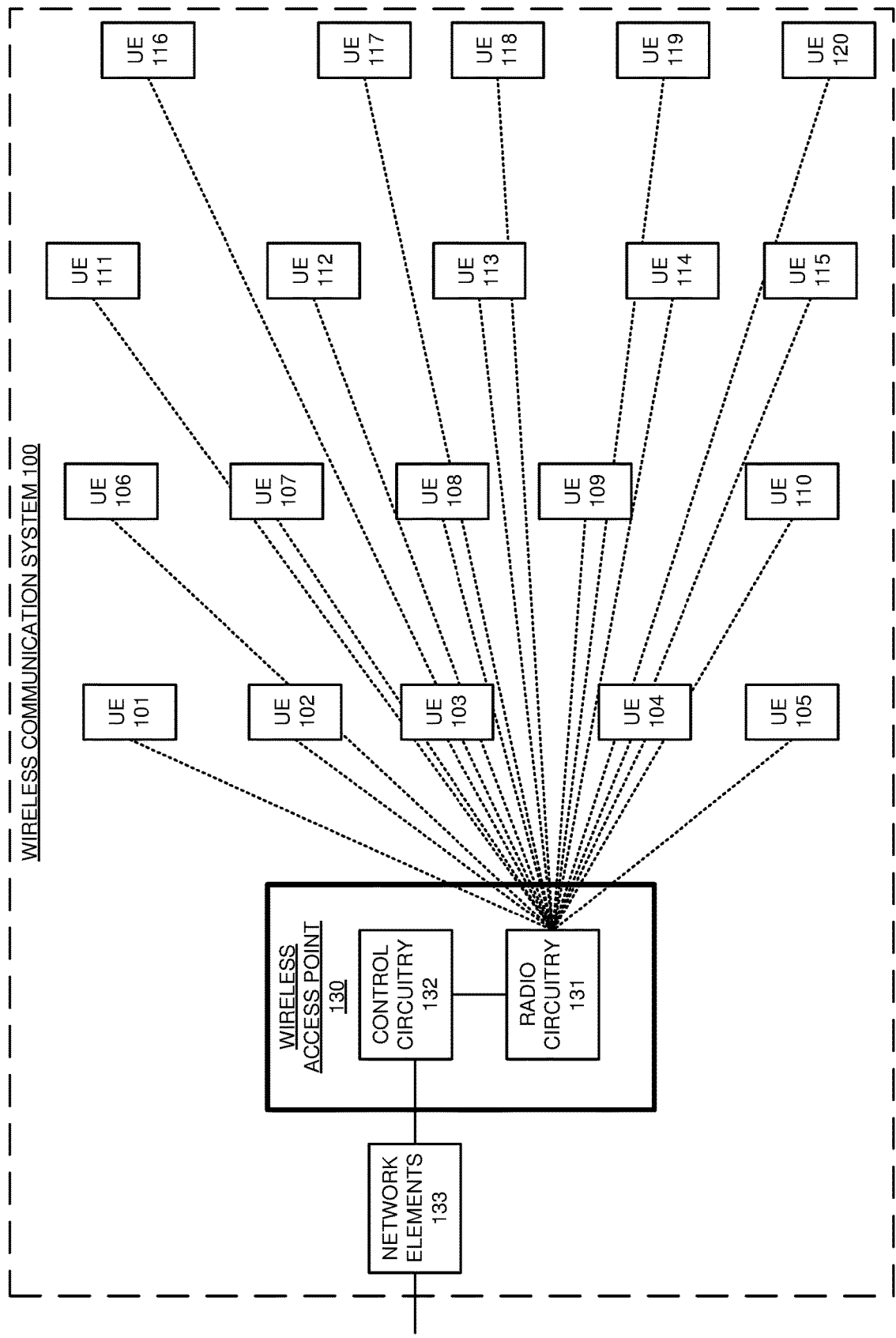
FIG. 1 illustrates a wireless communication system comprising a wireless access point that allocates power to User Equipment (UEs) to optimize wireless Multiple User Multiple Input Multiple Output (MU-MIMO) transmissions.

FIG. 1 illustrates wireless communication system 100 that comprises wireless access point 130 which allocates power to User Equipment (UEs) 101-120 to optimize Multiple User Multiple Input Multiple Output (MU-MIMO) transmissions. Wireless access point 130 serves wireless data services to UEs 101-120 such as internet access, voice/video calling, messaging, media streaming, machine-to-machine communications, business transactions, and/or some other over-the-air data service. Wireless communication system 100 has been simplified for clarity and typically comprises many more wireless access points and UEs.

UEs 101-120 could be computers, phones, displays, headsets, or some other user apparatus with wireless communication circuitry. UEs 101-120 wirelessly attach to wireless access point 130 over Long Term Evolution (LTE), Fifth Generation New Radio (5GNR), and/or some other wireless networking protocol. UEs 101-120 comprise radio circuitry and baseband circuitry. The radio circuitry comprises antennas, modulators, amplifiers, filters, digital/analog interfaces, processing circuitry, memory circuitry, firmware/software, and bus circuitry. The antennas may comprise a smaller array (4×4 or the like) that typically designates the MU-MIMO layer for the UE. The baseband circuitry comprises processing circuitry, memory circuitry, bus circuitry, and software. In the baseband circuitry, the processing circuitry executes operating systems, user applications, and network applications that are stored in the memory circuitry.

In wireless access point 130, radio circuitry 131 uses LTE, 5GNR, or some other wireless network protocol to communicate with UEs 101-120. Radio circuitry 131 and control circuitry 132 communicate over a communication link like Common Public Radio Interface (CPRI), Institute of Electrical and Electronic Engineers (IEEE) 802.3 (Ethernet), and/or some other data interface. In wireless access point 130, control circuitry 132 communicates with network elements 133 over backhaul circuitry. The backhaul circuitry comprises Time Division Multiplexing (TDM), Ethernet, Internet Protocol (IP), Data Over Cable System Interface Specification (DOCSIS), Wave Division Multiplexing (WDM), LTE, 5GNR, WIFI, and/or the like. Network elements 133 comprise other wireless access points, User Plane Functions (UPFs), Access and Mobility Management Functions (AMFs), Mobility Management Entities (MMEs), Serving Gateways (SGWs), and/or the like.

Wireless access point 130 comprises radio circuitry 131 and control circuitry 132. Radio circuitry 131 comprises antennas, modulators, amplifiers, filters, digital/analog interfaces, processing circuitry, memory circuitry, firmware/software, and bus circuitry. The antennas may comprise larger arrays (128×128 or the like). Radio circuitry 131 adjusts the transmit power and beamforming weights of wireless transmissions over the antennas to optimize MU-MIMO efficiency.

Control circuitry 132 comprises processing circuitry, memory circuitry, bus circuitry, and software. In control circuitry 132, the processing circuitry executes operating systems and network applications that are stored in the memory circuitry. The network applications may comprise Physical Layer (PHY), Media Access Control (MAC), Radio Link Control (RLC), Packet Data Control Protocol (PDCP), Radio Resource Control (RRC), Service Data Application Protocol (SDAP), and/or other networking software.

UEs 101-120 receive wireless data services from wireless access point 130. In response, UEs 101-120 generate and transfer network signaling to wireless access point 130. The network signaling indicates information like received signal strength and signal quality for UEs 101-120. Radio circuitry 131 wirelessly receives the network signaling from UEs 101-120 and transfers the network signaling to control circuitry 131. Radio circuitry 131 may determine and add additional information to the network signaling like uplink signal strength and the like.

Control circuitry 132 processes the network signaling to determine initial transmit power allocations for UEs 101-120. Typically, control circuitry 132 allocates transmit power to achieve adequate signal strength at each of UEs 101-120, where closer UEs 101-105 have a lower transmit power and distant UEs 116-120 have a higher transmit power. UEs in the same MU-MIMO layer may get the same initial power allocation. The MU-MIMO layer is designated by the number of active antenna elements at the transmitter or receiver—whichever is smaller.

Control circuitry 132 processes the network signaling to allocate UEs 101-120 into MU-MIMO groups—and not all UEs may make the MU-MIMO groups. The UEs in a given MU-MIMO group share the same time and frequency resources and use beamforming to isolate their own data signals. Control circuitry 132 typically sorts UEs 101-120 by their MU-MIMO layer and then groups UEs that are in the same MU-MIMO layer but that are geographically-diverse from one another. For example, UEs 111-115 may be sorted into the same MU-MIMO layer, and then UEs 111, 113, and 115 are grouped together based on their geographic-diversity. In a like manner, UEs 112 and 114 could be grouped together based on their geographic-diversity.

Control circuitry 132 processes the initial power allocations and the initial MU-MIMO groups to determine new power allocations and new MU-MIMO groups. In some examples, control circuitry 132 determines which UEs have excess power based on the power allocation for their MU-MIMO layer as compared to their reported signal quality. Control circuitry 132 also determines which UEs need additional power to remain within their MU-MIMO layer or to join a new MU-MIMO layer. Advantageously, control circuitry 132 reallocates transmit power among UEs 101-120, so UEs can remain in their MU-MIMO group or join a new MU-MIMO group. Radio circuitry 131 wirelessly transmits MU-MIMO signals in shared resource blocks using the new power allocations to UEs 101-120 in their new MU-MIMO groups.

For example, UEs 106-110 may be in the same MU-MIMO layer and have the same initial power allocation. Control circuitry 132 determines that UE 109 has excess transmit power for its reported signal quality. Control circuitry 132 also determines that UE 106 needs additional power to remain within the MU-MIMO layer. Control circuitry 132 reallocates transmit power from UE 109 to UE 106 so UE 106 can remain in the MU-MIMO layer.

In another example, UEs 111-115 are in the same MU-MIMO layer and have the same initial power allocation. Control circuitry 132 determines that UE 114 has excess power based on its signal quality. Control circuitry 132 also determines that UE 113 needs additional power to join a MU-MIMO layer with UEs 107-109. Control circuitry 132 reallocates transmit power from UE 114 to UE 113 so UE 113 can join the new MU-MIMO layer. UE 113 may then be grouped with UEs 107-109 in a new MU-MIMO group.

In yet another example, UEs 106-110 may be in the same MU-MIMO layer and have the same initial power allocation. Control circuitry 132 determines that UE 107 needs additional power to remain in its MU-MIMO layer. Control circuitry 132 also determines that UE 106 can relinquish power and join the MU-MIMO layer with UEs 112-114. Control circuitry 132 reallocates transmit power from UE 106 to UE 107 so UE 107 remain in its MU-MIMO layer. UE 106 joins the MU-MIMO layer with UEs 112-114.

Advantageously, wireless access point 130 adjusts UE power allocations to optimize the efficiency and effectiveness of MU-MIMO.

Figure 2:
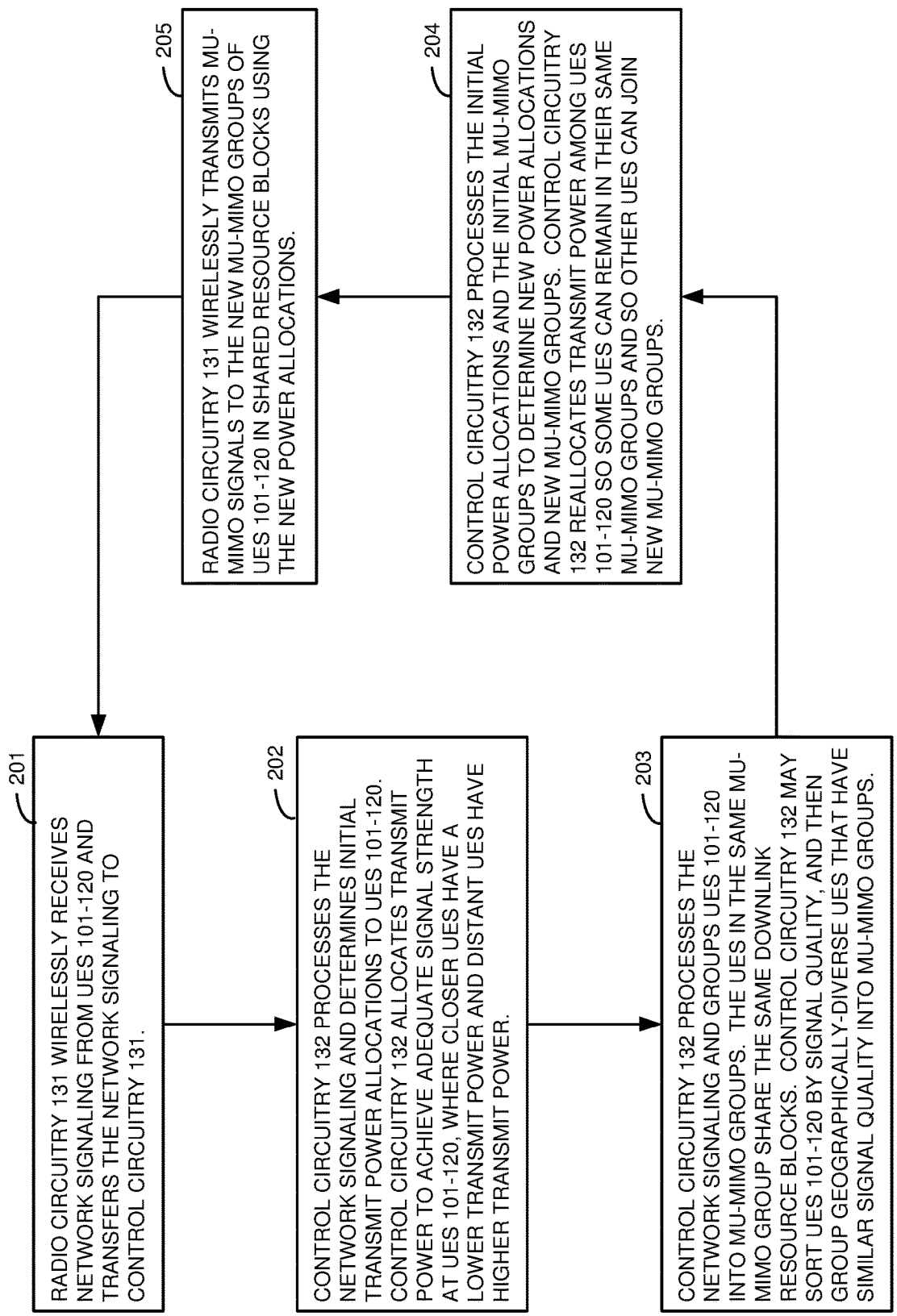
FIG. 2 illustrates the operation of the wireless access point to allocate power to UEs to optimize the wireless MU-MIMO transmissions.

FIG. 2 illustrates the operation of wireless access point 100 to allocate power to UEs 101-120 and optimize wireless MU-MIMO transmissions. Radio circuitry 131 wirelessly receives network signaling from UEs 101-120 and transfers the network signaling to control circuitry 131 (201). Control circuitry 132 processes the network signaling and determines initial transmit power allocations to UEs 101-120—possibly based on MU-MIMO layer (202). Control circuitry 132 allocates transmit power to achieve adequate signal strength at UEs 101-120, where closer UEs have a lower transmit power and distant UEs have higher transmit power. Control circuitry 132 processes the network signaling to group UEs 101-120 into MU-MIMO groups (203). The UEs in the same MU-MIMO group share the same downlink resource blocks. Control circuitry 132 may sort UEs 101-120 by signal quality, and then group geographically-diverse UEs that have similar signal quality. Control circuitry 132 processes the initial power allocations and the initial MU-MIMO groups to determine new power allocations and new MU-MIMO groups (204). Control circuitry 132 reallocates transmit power among UEs 101-120, so some UEs can remain in their MU-MIMO groups or join new MU-MIMO groups. Radio circuitry 131 wirelessly transmits MU-MIMO signals in shared resource blocks using the new power allocations to UEs 101-120 in the new MU-MIMO groups (205).

Figure 3:
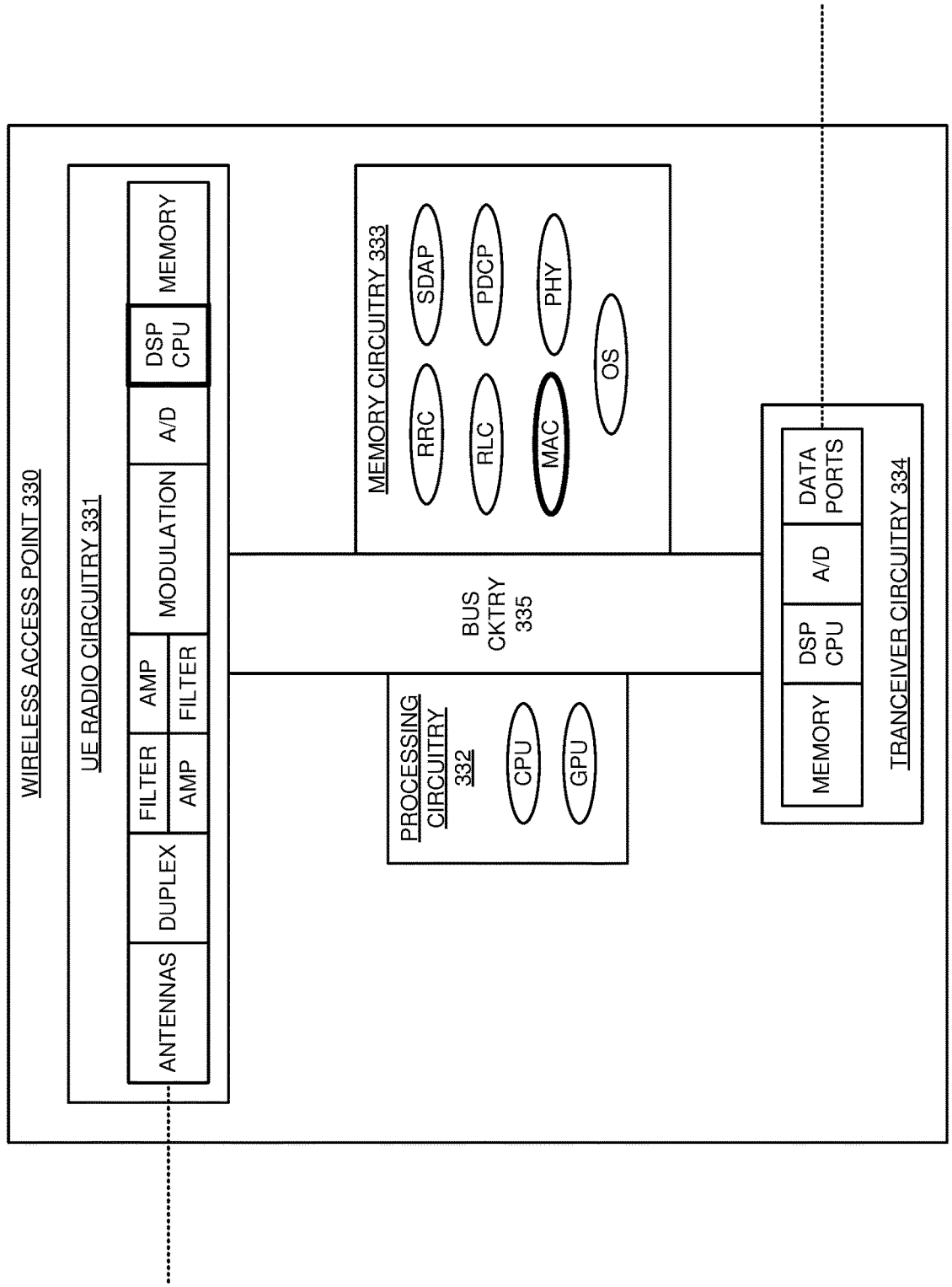
FIG. 3 illustrates a wireless access point to allocate power to UEs to optimize wireless MU-MIMO transmissions.

FIG. 3 illustrates wireless access point 330 to allocate power to UEs to optimize MU-MIMO. Wireless access point 330 is an example of wireless access point 130, although access point 130 may vary. Wireless access point 330 comprises radio circuitry 331, processing circuitry 332, memory circuitry 333, transceiver circuitry 334, and bus circuitry 335. Bus circuitry 335 couples radio circuitry 331, processing circuitry 332, memory circuitry 333, and transceiver circuitry 334. Memory circuitry 333 comprises volatile and non-volatile memories like flash, disc, tape, and the like. Memory circuitry 333 stores an operating system, network applications (PHY, MAC, RLC, PDCP, RRC, SDAP), and the like.

Radio circuitry 331 comprises antennas, duplexers, filters, amplifiers, modulation, Analog/Digital (A/D) interfaces, Digital Signal Processors/Central Processing Units (DSP/CPUs), and memory. The antennas comprise a large array of antenna elements like 128×128 or greater. Processing circuitry 333 comprises CPUs, Graphical Processing Units (GPUs), or some other computer hardware. Transceiver circuitry 334 comprises memory, DSP/CPU, A/D interfaces, and data ports. The data ports in transceiver circuitry 334 could be wireless and/or wireline and use TDM, Ethernet, IP, DOCSIS, WDM, LTE, 5GNR, WIFI, and/or the like.

In UE radio circuitry 331, the antennas exchange wireless signals with UEs using MU-MIMO for some of the UEs. The DSP/CPUs execute firmware/software to drive the exchange of data between the antennas and memory circuitry 333. The DSP/CPUs apply transmit power adjustments and beamforming weights on a per UE basis to optimize MU-MIMO. Processing circuitry 332 executes the operating system and network applications to drive the exchange of the data between radio circuitry 331 and transceiver circuitry 334 through memory circuitry 333. In transceiver circuitry 334, the data ports exchange user data and network signaling with other network elements like Node B, UPF, AMF, MME, and SGW.

The antennas in radio circuitry 331 receive wireless UL signals from wireless UEs. The antennas transfer corresponding electrical UL signals through the duplexers to the amplifiers. The amplifiers boost the UL signals for filters which attenuate unwanted energy. In modulation, demodulators down-convert the UL signals from their carrier frequencies. The A/D interfaces convert the analog UL signals into digital UL signals for the DSP/CPUs. The DSP/CPUs recover UL data and signaling from the UL signals. The DSP/CPUs store the UL data and signaling in memory circuitry 333. The network applications process the UL data and signaling in memory circuitry 333. The network applications transfer the UL data and signaling from memory circuitry 333 to other network elements over transceiver circuitry 334. Moreover, the RRCs receive network signaling from UEs that indicates received signal strength, signal-to-interference/noise, channel quality, MIMO layer/rank, precoding matrix, and the like. The RRCs transfer this information (received signal strength, signal-to-interference/noise, channel quality, MIMO layer/rank, precoding matrix) to the MACs.

Transceiver circuitry 334 receives Downlink (DL) signals from the network elements and recovers DL data and signaling from the DL signals. The DSP/CPUs in transceiver circuitry 334 transfer the DL data and signaling to memory circuitry 333. The network applications transfer the DL data and signaling from memory circuitry 333 to radio circuitry 331. In particular, the MACs allocate transmit power to UEs, group MU-MIMO UEs, and schedule resource blocks for UEs based on their QoS which includes scheduling MU-MIMO UEs in shared resource blocks.

In radio circuitry 331, the DSP/CPUs adjust transmit power per the MAC and apply beamforming per UE location. The DSP/CPUs transfer corresponding DL signals to the A/D interface. The A/D interface converts the digital DL signals into analog DL signals for the modulators. The modulators up-convert the DL signals to their carrier frequencies. The amplifiers boost the DL signals for the filters which attenuate unwanted out-of-band energy. The filters transfer the DL signals through the duplexers to the antennas. The electrical DL signals drive the antennas to emit corresponding wireless DL signals to the wireless UEs.

In wireless access point 330, the PHYs map between the MAC transport channels and PHY transport channels. The PHY functions comprise packet formation/deformation, windowing/de-windowing, guard-insertion/guard-deletion, parsing/de-parsing, control insertion/removal, interleaving/de-interleaving, Forward Error Correction (FEC) encoding/decoding, rate matching/de-matching, scrambling/descrambling, modulation mapping/de-mapping, channel estimation/equalization, Fast Fourier Transforms/Inverse Fast Fourier Transforms (FFTs/IFFTs), channel coding/decoding, layer mapping/de-mapping, precoding, Discrete Fourier Transforms/Inverse Discrete Fourier Transforms (DFTs/IDFTs), and Resource Element (RE) mapping/de-mapping.

The MACs map between the MAC transport channels and MAC logical channels. MAC functions include buffer status, power control, MU-MIMO grouping, channel quality, Hybrid Answer Repeat Request (HARQ), user identification, random access, resource block scheduling, and Quality-of-Service (QoS). The RLCs map between the MAC logical channels and Protocol Data Units (PDUs). RLC functions comprise Answer Repeat Request (ARQ), sequence numbering and resequencing, segmentation and resegmentation. The RLCs exchange data and signaling with the PDCPs. The PDCPs map between the PDUs from the RLCs and Service Data Units (SDUs) for the RRCs/SDAPs. PDCP functions comprise security ciphering, header compression and decompression, sequence numbering and re-sequencing, de-duplication. The PDCPs exchange SDUs with the RRCs and SDAPs.

The RRCs interact with wireless network controllers like AMFs and/or MMEs to establish and terminate data sessions. The RRCs support N1/N2 messaging with the AMFs. The RRCs handle security and key management, handover operations, status reporting, QoS, system broadcasts, and network pages. The SDAPs exchange S3 data with UPFs under the control of SMFs. The SDAPs map between the SDUs and the QoS flows and mark the QoS flows with the proper QoS.

Figure 4:
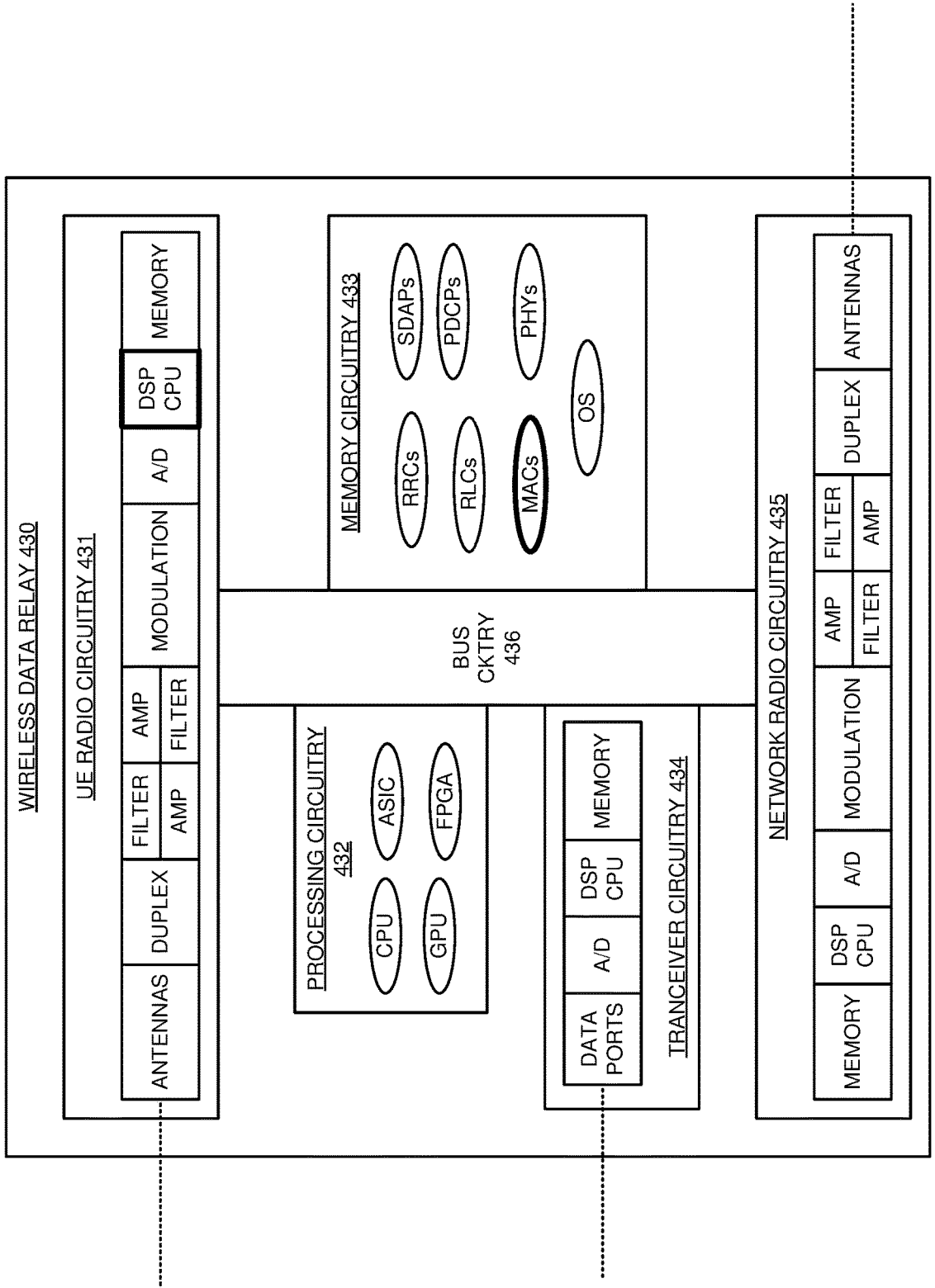
FIG. 4 illustrates a wireless relay to allocate power to UEs to optimize wireless MU-MIMO transmissions.

FIG. 4 illustrates wireless relay 430 to allocate power to UEs to optimize MU-MIMO. Wireless relay 430 is an example of wireless access point 130, although access point 130 may differ. Wireless relay 430 comprises UE radio circuitry 431, processing circuitry 432, memory circuitry 433, transceiver circuitry 434, network radio circuitry 435, and bus circuitry 436. Bus circuitry 436 couples UE radio circuitry 431, processing circuitry 432, memory circuitry 433, and transceiver circuitry 434, and network radio circuitry 435. Memory circuitry 433 comprises volatile and non-volatile memories like flash, disc, tape, and the like. Memory circuitry 433 stores an operating system and network applications (PHY, MAC, RLC, PDCP, RRC, and SDAP. Processing circuitry 432 comprises CPUs, GPUs, Application Specific Integrated Circuits (ASICs), Field Programmable Gate Array (FPGAs), or some other computer hardware. Transceiver circuitry 434 comprises memory, DSP/CPU, A/D interface, and data ports. The data ports are wireline and use TDM, Ethernet, IP, DOCSIS, WDM, and/or the like.

Radio circuitry 431 comprises antennas, duplexers, filters, amplifiers, modulation, A/D interfaces, DSP/CPUs, and memory. The antennas comprise an array that exchanges wireless signals with UEs using MU-MIMO for some of the UEs. The DSP/CPUs execute firmware/software to drive the exchange of data between the antennas and memory circuitry 433. The DSP/CPUs apply transmit power adjustments and beamforming weights on a per UE basis to optimize MU-MIMO. Processing circuitry 432 executes the operating system and network applications to drive the exchange of the data between UE radio circuitry 431 and network radio circuitry 435 through memory circuitry 433.

Network radio circuitry 435 comprises antennas, duplexers, filters, amplifiers, modulation, A/D interfaces, DSP/CPUs, and memory. The antennas may comprise an array that exchanges wireless signals with wireless access points or relays and designates the MU-MIMO layer for relay 430. The DSP/CPUs execute firmware/software to drive the exchange of data between the antennas and memory circuitry 433. In network radio circuitry 435, the antennas exchange user data and network signaling with other network elements like Node Bs and other relays. The DSP/CPUs execute firmware/software to drive the exchange of data between the antennas and memory circuitry 433.

The antennas in UE radio circuitry 431 receive wireless UL signals from wireless UEs. The antennas transfer corresponding electrical UL signals through the duplexers to the amplifiers. The amplifiers boost the UL signals for filters which attenuate unwanted energy. In modulation, demodulators down-convert the UL signals from their carrier frequencies. The A/D interfaces convert the analog UL signals into digital UL signals for the DSP/CPUs. The DSP/CPUs recover UL data and signaling from the UL signals. The DSP/CPUs store the UL data and signaling in memory circuitry 433. The network applications process the UL data and signaling in memory circuitry 433. The network applications transfer the UL data and signaling from memory circuitry 433 to network radio circuitry 435. Moreover, the RRCs receive network signaling from UEs that indicates received signal strength, signal-to-interference/noise, channel quality, MIMO layer/rank, precoding matrix, and the like. The RRCs transfer this information (received signal strength, signal-to-interference/noise, channel quality, MIMO layer/rank, precoding matrix) to the MACs.

In network radio circuitry 435, the DSP/CPUs process the UL data and signaling and transfer corresponding UL signals to the analog/digital interface. The analog/digital interface converts the digital UL signals into analog UL signals for the modulators. The modulators up-convert the UL signals to their carrier frequencies. The amplifiers boost the UL signals for the filters which attenuate unwanted out-of-band energy. The filters transfer the UL signals through the duplexers to the antennas. The electrical UL signals drive the antennas to emit corresponding wireless UL signals to wireless access points or other relays.

In network radio circuitry 435, the antennas receive wireless Downlink (DL) signals from wireless access points or relays and transfer corresponding electrical DL signals through the duplexers to the amplifiers. The amplifiers boost the DL signals for filters which attenuate unwanted energy. In modulation, demodulators down-convert the DL signals from their carrier frequencies. The analog/digital interfaces convert the analog DL signals into digital DL signals for the DSP/CPUs. The DSP/CPUs recover DL data and signaling from the DL signals. The DSP/CPUs may apply beamforming to isolate their own DL signals from those of other UEs in a MU-MIMO group. The DSP/CPUs transfer the DL data and signaling to memory circuitry 433. The network applications process and modify the DL data and signaling in memory circuitry 415. The network applications transfer the DL data and signaling from memory circuitry 415 to UE radio circuitry 431. In particular, the MACs allocate transmit power to UEs, group UEs into MU-MIMO groups, and schedule resource blocks for UEs—including scheduling shared MU-MIMO resource blocks for some UEs.

In UE radio circuitry 431, the DSP/CPUs adjust transmit power per the MAC and apply beamforming per UE location. The DSP/CPUs transfer corresponding DL signals to the A/D interface. The A/D interface converts the digital DL signals into analog DL signals for the modulators. The modulators up-convert the DL signals to their carrier frequencies. The amplifiers boost the DL signals for the filters which attenuate unwanted out-of-band energy. The filters transfer the DL signals through the duplexers to the antennas. The electrical DL signals drive the antennas to emit corresponding wireless DL signals to the wireless UEs.

In wireless relay 430, the PHYs map between the MAC transport channels and PHY transport channels. The PHY functions comprise packet formation/deformation, windowing/de-windowing, guard-insertion/guard-deletion, parsing/de-parsing, control insertion/removal, interleaving/de-interleaving, FEC encoding/decoding, rate matching/dematching, scrambling/descrambling, modulation mapping/de-mapping, channel estimation/equalization, FFTs/IFFTs, channel coding/decoding, layer mapping/de-mapping, precoding, DFTs/IDFTs, and RE mapping/de-mapping.

The MACs map between the MAC transport channels and MAC logical channels. MAC functions include MU-MIMO grouping, buffer status, power control, MU-MIMO grouping, channel quality, HARQ, user identification, random access, resource block scheduling, and QoS. The RLCs map between the MAC logical channels and PDUs. RLC functions comprise ARQ, sequence numbering and resequencing, segmentation and resegmentation. The RLCs exchange data and signaling with the PDCPs.

The PDCPs map between the PDUs from the RLCs and SDUs for the RRCs/SDAPs. PDCP functions comprise security ciphering, header compression and decompression, sequence numbering and re-sequencing, de-duplication. The PDCPs exchange SDUs with the RRCs and SDAPs. The RRCs interact with wireless network controllers like AMFs and/or MMEs to establish and terminate data sessions. The RRCs support N1/N2 messaging with the AMFs. The RRCs handle security and key management, handover operations, status reporting, QoS, system broadcasts, and network pages. The SDAPs exchange S3 data with UPFs. The SDAPs map between the SDUs and the QoS flows and mark the QoS flows with the proper QoS.

Figure 5:
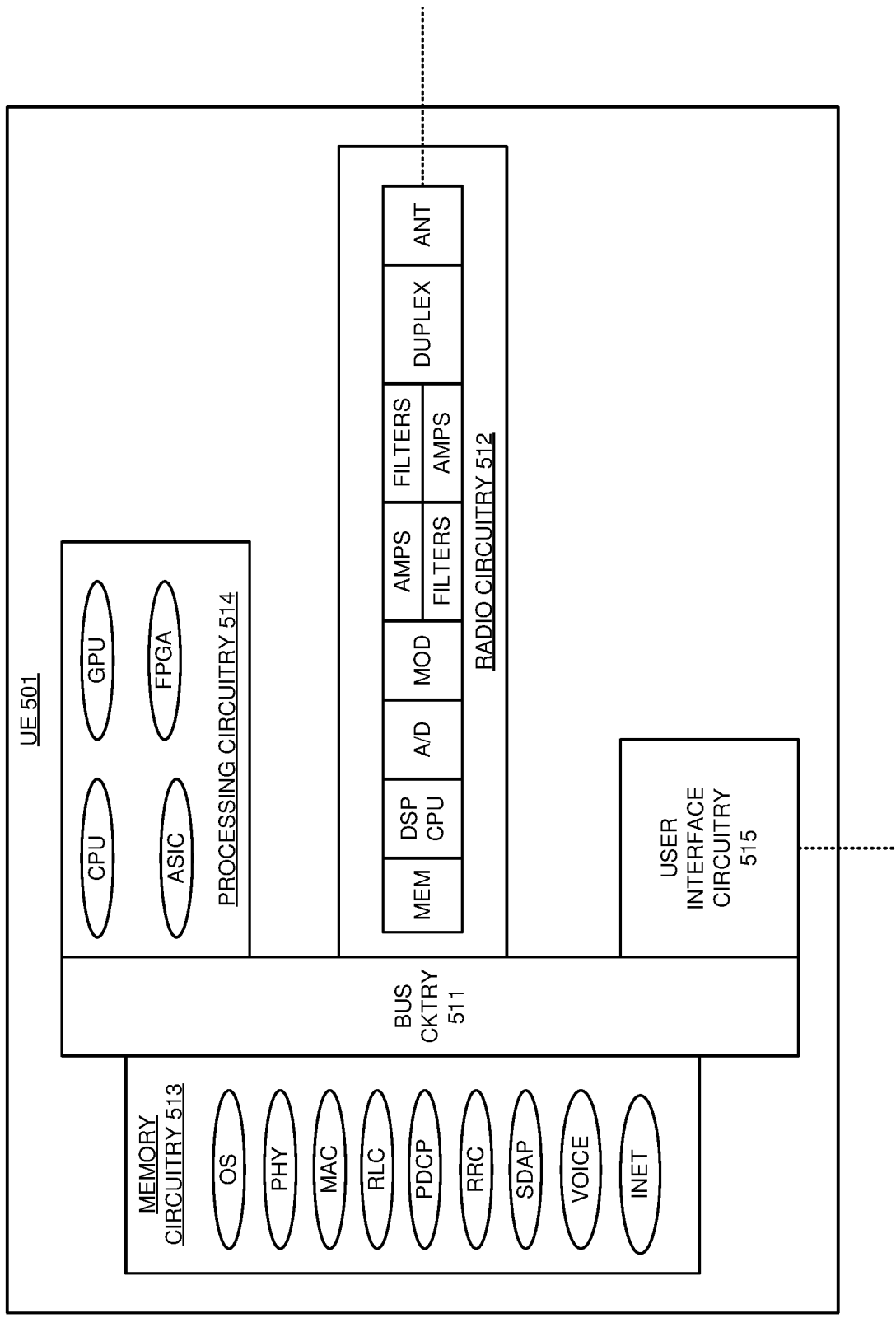
FIG. 5 illustrates a UE that receives optimized wireless MU-MIMO transmissions.

FIG. 5 illustrates UE 501 with optimized receive power to receive wireless MU-MIMO signals. UE 501 comprises bus circuitry 511, radio circuitry 512, memory circuitry 513, processing circuitry 514, and user interface circuitry 515. Bus circuitry 511 couples radio circuitry 512, memory circuitry 513, processing circuitry 514, and user interface circuitry 515. Memory circuitry 513 comprises volatile and non-volatile memories like flash, disc, tape, and the like. Memory circuitry 513 stores operating systems, network applications, voice user applications, and internet-access (INET) user applications. The network applications comprise PHY, MAC, RLC, PDCP, RRC, SDAP, and the like.

Processing circuitry 514 comprises CPUs, GPUs, ASICs, FPGAs and/or some other computer hardware. Processing circuitry 514 executes the operating systems, network applications, and user applications to drive radio circuitry 512 and user interface circuitry 515. User interface circuitry 515 comprises displays, speakers, microphones, transceivers, ports, and/or some other user component.

Radio circuitry 512 comprises antennas, duplexers, filters, amplifiers, modulators, A/D interfaces, DSP, CPU, and memory. The antennas may comprise a small array that designates the MU-MIMO layer. The antennas in radio circuitry 512 exchange wireless data and signaling with wireless access points or relays. The DSP/CPUs execute firmware/software to drive the exchange of the data and signaling between the antennas and memory circuitry 513. Processing circuitry 514 executes the operating systems and network applications to process the data and signaling in memory circuitry 513. The RRCs transfer network signaling to network RRCs where the signaling that indicates received signal strength, signal-to-interference/noise, channel quality, MIMO layer/rank, precoding matrix, and the like.

The user voice and video applications generate voice/video data and signaling—typically by user interface circuitry 515 sensing voice/video data. The network applications process the application data and signaling to generate and store UL data and signaling in the radio memory. In radio circuitry 512, the DSP/CPUs process the UL data and signaling and transfer corresponding UL signals to the A/D interface. The analog/digital interface converts the digital UL signals into analog UL signals for the modulators. The modulators up-convert the UL signals to their carrier frequencies. The amplifiers boost the UL signals for the filters which attenuate unwanted out-of-band energy. The filters transfer the UL signals through the duplexers to the antennas. The electrical UL signals drive the antennas to emit corresponding wireless UL signals to the wireless access points or relays.

In radio circuitry 512, the antennas receive wireless Downlink (DL) signals from the wireless access points or relays and transfer corresponding electrical DL signals through the duplexers to the amplifiers. The amplifiers boost the DL signals for filters which attenuate unwanted energy. In modulation, demodulators down-convert the DL signals from their carrier frequencies. The analog/digital interfaces convert the analog DL signals into digital DL signals for the DSP/CPUs. The DSP/CPUs recover DL data and signaling from the DL signals. The DSP/CPUs may apply beamforming to isolate their own DL signals from those of other UEs in a MU-MIMO group. The DSP/CPUs transfer the DL data and signaling to memory circuitry 513. The network applications process the DL data and signaling in memory circuitry 513 to generate voice/video data and application signaling. The voice and video applications process the voice/video data and application signaling—typically by user interface circuitry 515 presenting the voice/video data.

Figure 6:
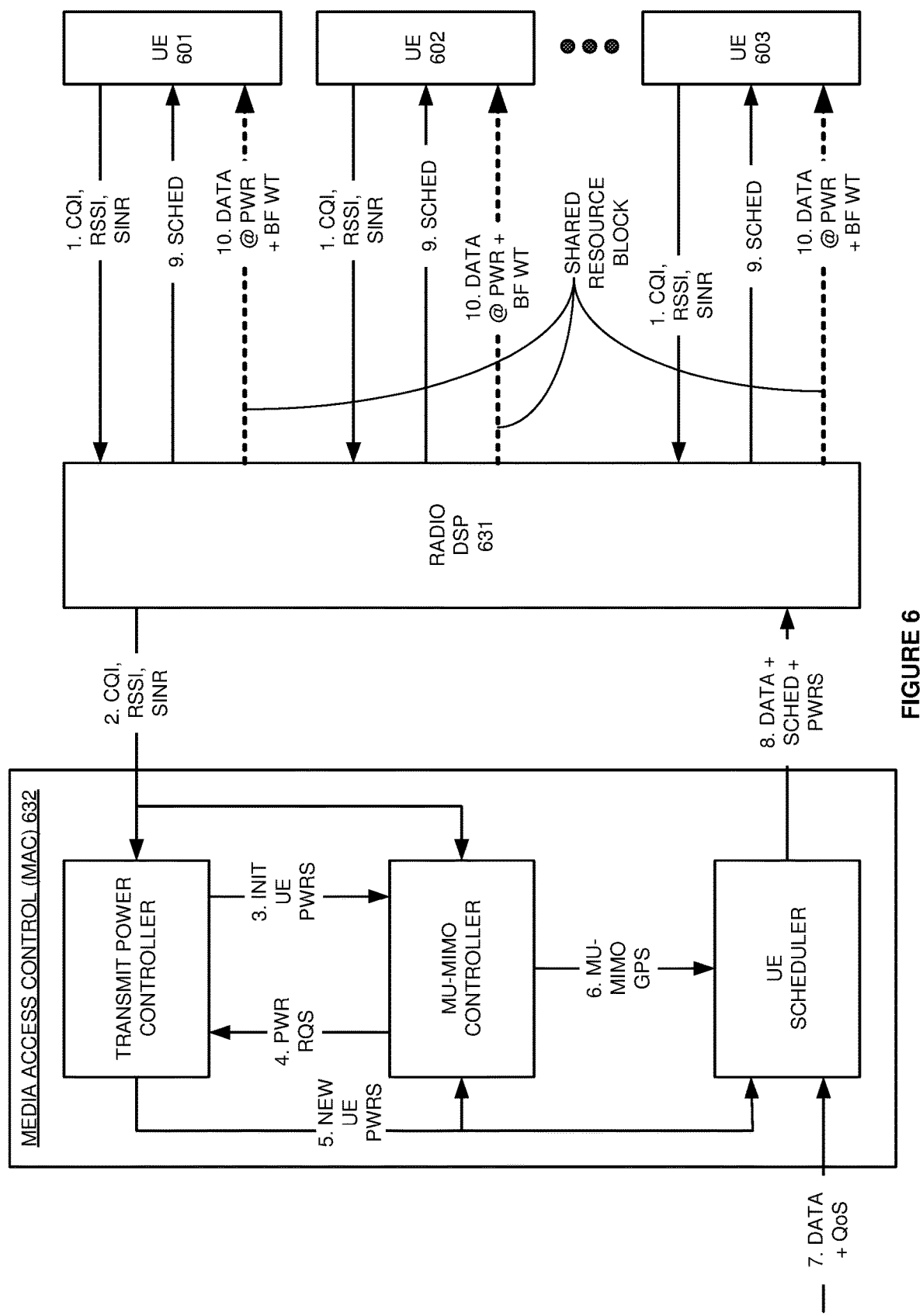
FIG. 6 illustrates a Media Access Control (MAC) to allocate power to UEs to optimize wireless MU-MIMO transmissions.

FIG. 6 illustrates Radio Digital Signal Processor (DSP) 631 and Media Access Control (MAC) 632 that allocate power to UEs 601-603 to optimize wireless MU-MIMO transmissions. The configuration and operations are exemplary, and wireless access point 130 may differ. In a first operation, UEs 601-603 receive wireless data services and responsively transfer their Channel Quality Index (CQI), Received Signal Strength Indicator (RSSI), and Signal to Interference/Noise Ratio (SINR) in CPRI signaling to radio DSP 631. In a second operation, radio DSP 631 transfers the CQI, RSSI, and SINR data for UEs 601-603 to a transmit power controller in MAC 632. The transmit power controller processes the CQI, RSSI, and SINR data for UEs 601-603 to determine initial transmit power allocations. UEs in the same MU-MIMO layer get the same initial power allocation.

In a third operation, the transmit power controller indicates the initial transmit power allocations for UEs 601-603 to a MU-MIMO controller in MAC 632. The MU-MIMO controller processes the initial transmit power allocations and UE locations to allocate UEs 601-602 into a MU-MIMO group. UE 603 does not make a MU-MIMO group. The UEs in the MU-MIMO group will share the same Orthogonal Frequency Division Multiplex (OFDM) resource blocks and apply beamforming to extract their own data from the shared resource blocks.

The MU-MIMO controller processes the initial transmit power allocations and the initial MU-MIMO groups to determine new power allocations and new MU-MIMO groups. To re-allocate transmit power, the MU-MIMO controller determines which UEs have excess power based on their power allocation compared to their CQI. The MU-MIMO controller also determines which UEs need additional power to join a better MU-MIMO group. In this example, UE 601 has excess power for its CQI, and UE 603 lacks enough power for the MU-MIMO group.

In a fourth operation, the MU-MIMO controller reallocates transmit power from UE 601 to UE 603 by requesting the power adjustment from the transmit power controller. In a fifth operation, the transmit power controller grants the requests and indicates the new UE power allocations to the MU-MIMO controller and to a UE scheduler. The MU-MIMO controller regroups the UEs into new MU-MIMO groups based on the new UE power allocations. UEs 601-603 are now all in the MU-MIMO group. In a sixth operation, the MU-MIMO controller indicates the MU-MIMO groups to the UE scheduler.

In a seventh operation, the UE scheduler receives UE data and QoS parameters. The UE scheduler schedules shared OFDM resource blocks for UEs 601-603 based on their QoS and MU-MIMO group. In an eighth operation, the UE scheduler transfers the UE data, schedule, and power allocations to radio DSP 631. Radio DSP 631 adjusts the data transmit power per the MAC and also applies beamforming based on UE location. In a ninth operation, radio DSP 631 transfers the schedule for UEs 601-603. In a tenth operation, radio DSP 631 transfers the data to UEs 601-603 using their individual UE power allocations and UE beamforming weights. UEs 601-603 use beamforming to extract their own UE data from the shared resource blocks.

The wireless data network circuitry described above comprises computer hardware and software that form special-purpose wireless access points that adjust transmit power to optimize MU-MIMO. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuity and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose wireless access points that adjust transmit power to optimize MU-MIMO.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a wireless access point to serve wireless User Equipment (UEs), using Multiple User Multiple Input Multiple Output (MU-MIMO), the method comprising:
   radio circuitry wirelessly receiving network signaling from the UEs;
   control circuitry processing the network signaling and responsively determining initial power allocations to the UEs and initial MU-MIMO groups of the UEs;
   the control circuitry processing the initial power allocations and the initial MU-MIMO groups and responsively determining new power allocations and new MU-MIMO groups by allocating additional power to one of the UEs and responsively determining one of the new MU-MIMO groups having a higher MU-MIMO layer for the one UE based on the additional power allocation; and
   the radio circuitry wirelessly transmitting MU-MIMO signals to the new MU-MIMO groups of the UEs in shared resource blocks using the new power allocations.

2. The method of claim 1 wherein the control circuitry determining the new power allocations comprises the control circuitry re-allocating power among the UEs in a same MU-MIMO layer.

3. The method of claim 1 wherein the control circuitry determining the new power allocations comprises the control circuitry re-allocating power among the UEs in different MU-MIMO layers.

4. The method of claim 1 wherein the control circuitry determining the new power allocations and the new MU-MIMO groups comprises the control circuitry allocating additional power to one of the UEs and responsively determining one of the new MU-MIMO groups for the one UE based on the additional power allocation.

5. The method of claim 1 wherein the control circuitry determining the new power allocations and the new MU-MIMO groups comprises the control circuitry allocating lower power to one of the UEs and responsively determining one of the new MU-MIMO groups for the one UE based on the lower power allocation.

6. The method of claim 1 wherein the control circuitry determining the new power allocations and the new MU-MIMO groups comprises the control circuitry allocating lower power to one of the UEs and responsively determining one of the new MU-MIMO groups having a lower MU-MIMO layer for the one UE based on the lower power allocation.

7. The method of claim 1 wherein the radio circuitry wirelessly receiving the network signaling and the control circuitry processing the network signaling comprises the radio circuitry wirelessly receiving channel quality information and the control circuitry processing the channel quality information.

8. The method of claim 1 wherein the radio circuitry wirelessly receiving the network signaling and the control circuitry processing the network signaling comprises the radio circuitry wirelessly receiving Signal-to-Interference and Noise Ratio (SINR) information and the control circuitry processing the SINR information.

9. The method of claim 1 wherein the radio circuitry wirelessly receiving the network signaling and the control circuitry processing the network signaling comprises the radio circuitry wirelessly receiving received signal strength information and the control circuitry processing the received signal strength information.

10. A wireless access point to serve wireless User Equipment (UEs) using Multiple User Multiple Input Multiple Output (MU-MIMO), the wireless access point comprising:
    radio circuitry configured to wirelessly receive network signaling from the UEs;
    control circuitry configured to process the network signaling and responsively determine initial power allocations to the UEs and initial MU-MIMO groups of the UEs;
    the control circuitry configured to process the initial power allocations and the initial MU-MIMO groups and responsively determine new power allocations and new MU-MIMO groups by allocating additional power to one of the UEs and responsively determining one of the new MU-MIMO groups having a higher MU-MIMO layer for the one UE based on the additional power allocation; and
    the radio circuitry configured to wirelessly transmit MU-MIMO signals to the new MU-MIMO groups of the UEs in shared resource blocks using the new power allocations.

11. The wireless access point of claim 10 wherein the control circuitry is configured to re-allocate power among the UEs in a same MU-MIMO layer.

12. The wireless access point of claim 10 wherein the control circuitry is configured to re-allocate power among the UEs in different MU-MIMO layers.

13. The wireless access point of claim 10 wherein the control circuitry is configured to allocate additional power to one of the UEs and responsively determine one of the new MU-MIMO groups for the one UE based on the additional power allocation.

14. The wireless access point of claim 10 wherein the control circuitry is configured to allocate lower power to one of the UEs and responsively determine one of the new MU-MIMO groups for the one UE based on the lower power allocation.

15. The wireless access point of claim 10 wherein the control circuitry is configured to allocate lower power to one of the UEs and responsively determine one of the new MU-MIMO groups having a lower MU-MIMO layer for the one UE based on the lower power allocation.

16. The wireless access point of claim 10 wherein the network signaling comprises channel quality information.

17. The wireless access point of claim 10 wherein the network signaling comprises Signal-to-Interference and Noise Ratio (SINR) information.

18. The wireless access point of claim 10 wherein the network signaling comprises received signal strength information.

* * * * *